(12) United States Patent
Strauser

(10) Patent No.: US 8,142,545 B2
(45) Date of Patent: Mar. 27, 2012

(54) DUST SEPARATION SYSTEM FOR USE WITH MOBILE EQUIPMENT

(75) Inventor: Daniel P. Strauser, Elgin, IL (US)

(73) Assignee: Federal Signal Corporation, Oak Brook, IL (US)

( * ) Notice: Subject to any disclaimer, the term of this patent is extended or adjusted under 35 U.S.C. 154(b) by 1007 days.

(21) Appl. No.: 11/803,573

(22) Filed: May 15, 2007

(65) Prior Publication Data

US 2007/0295209 A1 Dec. 27, 2007

Related U.S. Application Data

(60) Provisional application No. 60/800,363, filed on May 15, 2006.

(51) Int. Cl.
*B01D 46/46* (2006.01)
(52) U.S. Cl. ............... 95/23; 55/385.3; 55/344; 55/346; 95/1
(58) Field of Classification Search .................. 95/1, 23; 55/385.3, 344, 346
See application file for complete search history.

(56) References Cited

U.S. PATENT DOCUMENTS

| | | | | |
|---|---|---|---|---|
| 303,204 A | * | 8/1884 | Bennett | 266/186 |
| 1,298,761 A | * | 4/1919 | Miller | 266/189 |
| 1,890,070 A | * | 12/1932 | Whiton, Jr. | 96/400 |
| 2,119,478 A | | 2/1937 | Whiton, Jr. | |
| 2,806,551 A | * | 9/1957 | Heinrich | 55/340 |
| 2,932,845 A | * | 4/1960 | Rydberg | 15/346 |
| 3,635,003 A | * | 1/1972 | Schindling et al. | 55/344 |
| 3,726,065 A | * | 4/1973 | Hausberg et al. | 96/253 |
| 4,457,043 A | | 7/1984 | Oeberg et al. | |
| 5,662,079 A | * | 9/1997 | Snider | 123/188.14 |
| 6,161,250 A | * | 12/2000 | Young et al. | 15/346 |
| 6,221,134 B1 | | 4/2001 | Conrad et al. | |

FOREIGN PATENT DOCUMENTS

| | | |
|---|---|---|
| EP | 0 428 911 A | 5/1991 |
| WO | WO 81/01362 A | 5/1981 |

OTHER PUBLICATIONS

Communication Relating to the Results of the Partial International Search from PCT/US2007/011628 issued Nov. 13, 2007.
Rule 1186, PM10 Emissions from Paved and Unpaved Roads, and Livestock Operations, adopted Feb. 14, 1997.

(Continued)

*Primary Examiner* — Jason M Greene
*Assistant Examiner* — Anthony Shumate
(74) *Attorney, Agent, or Firm* — McDonnell Boehnen Hulbert & Berghoff LLP

(57) ABSTRACT

Embodiments of the invention include a dust extraction system including an array of two or more centrifugal dust removal devices, e.g., axial cyclones. The array of axial cyclones is configured to operate in parallel. The array of axial cyclones includes one or more sensor and a controller in communication with the sensor and adapted to receive air flow information from the one or more sensor. Inflow valves are operatively connected to the controller such that air flow through the array of axial cyclones is monitored and maintained at an optimum operating condition for each of the individual cyclones in the array. This is done, in general, by opening inflow valves as the air flow increases above a predetermined air flow value and shutting inflow valves as air flow decreases below the predetermined air flow value threshold.

1 Claim, 3 Drawing Sheets

OTHER PUBLICATIONS

Brochure, Guzzler CL Industrial Vacuum Leader brochure, Federal Signal Corporation, Mar. 2006.
Brochure, Guzzler ACE Industrial Vacuum Leader brochure, Federal Signal Corporation, Jan. 2006.
Brochure, GeoVac 4 Wheel Vacuum Air Sweeper brochure, Federal Signal Corporation, Jan. 2006.
Article, Pressure head, Wikipedia, Nov. 8, 2010.

* cited by examiner

DUST SEPARATION SYSTEM FOR USE WITH MOBILE EQUIPMENT

This application claims the benefit of U.S. provisional application No. 60/800,363, filed May 15, 2006.

FIELD OF THE INVENTION

This invention pertains generally to dust separation systems and mobile sweeping, cleaning and conveying equipment, and the like, including such systems. In particular, embodiments of dust separation systems according to the invention are intended for use with mobile cleaning equipment such as mobile vacuum air sweepers or street sweepers, mobile sewer cleaners, mobile industrial vacuum loaders, i.e., mobile pneumatic conveyance equipment, and the like. More particularly, the invention is directed to the use of a plurality of axial cyclone separators or devices for removing debris and/or dust in a mobile cleaning vehicle. The axial cyclone separators are controlled during operation of the vehicle to remove detritus including particulate matter from air flowing through the system to maintain optimal operating efficiency of the axial cyclone devices.

BACKGROUND OF THE INVENTION

Mobile vacuum sweepers and/or collection systems and the like have proven to be useful in a number of applications. Some uses of these devices typically include the use of a vacuum to pick up particulate matter and fluids. For example, truck-mounted vacuum cleaning systems have long been used to clean a wide variety of debris from areas such as waste collection areas of power plants, steel mills, and other industrial sites. Also, these types of vehicle-based systems are employed in non-industrial applications to remove debris of all kinds from streets and other locations. In some industrial applications, these systems enable efficient acquisition and moving of particulate matter and in a safe, relatively dust-free manner. In other applications, the removal of debris and the cleaning of streets and other sites yield environmental, safety as well as aesthetic benefits.

Typically, vacuum debris cleaning systems have a vacuum system to lift the debris or matter and one or more collection chambers into which the collected debris and other particulate material and/or fluids are deposited (such debris collection tanks or hoppers are commonly referred to as "debris bodies" in the art). A high velocity blower or fan generates a negative pressure, causing a stream of air to flow through a vacuum pick-up head and flexible hose or similar conveyance that induces the debris to flow from the collection site through a hose or a similar device, preferably a flexible hose, to the debris body in which heavier debris particles are deposited. The debris body may include a tortuous air path to allow debris to fall out of the air stream. However, lighter debris particles may tend to remain in the air stream and continue to move toward the blower and the exhaust where the dust may be released to the environment as part of the exhaust air from the air stream. Of course, exhausting fine particulate matter as a result of the incomplete capture of dust and debris is not acceptable. For various reasons, this type of material is desired to be captured and in fact, there are existing clean air and related laws which specify the operational parameters required to be met by operation of sweeping and vacuuming cleaning mobile vehicles and the like. For example, see SCAQMD rule 1186, concerning the control of air emissions from street sweepers.

In response to the desire to capture fine particulate matter, such as dust, in such operations, filter bags or sock filters are commonly employed to capture such fugitive airborne debris in vacuum cleaning systems. While generally effective at removing debris particles from the air stream, filter bags and sock filters can become clogged quickly and, accordingly, must be cleaned and/or replaced frequently, when brought into contact with many types of airborne debris particles.

As an adaptation to improve the performance of bag and sock filtration systems, purge systems that agitate or shake the filters or periodically deliver a charge of compressed air to the filters have been proposed (see, e.g., U.S. Pat. Nos. 4,336,040 and 5,409,512). Unfortunately, in practice most shaker and agitator systems have been shown to make only modest improvements in filter life. Moreover, such systems may require a large number of mechanical and/or pneumatic components and thereby increase the cost of the system as well as the likelihood of system failure. So, it can be seen that these adaptations, while effective, tend to add complexity and cost to the system and maintenance of the system.

Another approach to improving the capture of airborne debris particles is to use a tangential cyclone to separate heavier airborne debris particles before the air stream contacts the filter bags. Examples of such systems are described in European Patent Application 0 434 007 and U.S. Pat. No. 5,996,171. Such systems are further exemplified by Guzzler® and Ace®, which are vacuum trucks sold by the Federal Signal Corporation. While effective in many respects, the effective filter life and efficiency in such serial cyclone separator/bag-house filter systems still often remains shorter than the period of desired operation. Tangential cyclones tend to be bulky devices, necessitating a relatively large amount of space to accommodate them.

Another solution to the problem of removing detritus in a vacuuming operation is the use of a tortuous path as part of the capture process. Use of a tortuous path in a debris collection hopper permits particulate matter to drop out of the air stream. In this method, detritus or particulate matter and/or fluids is picked up with a vacuum head and conveyed through a container by way of a tortuous air path. The tortuous air path permits heavier solid and/or liquid particles to fall out of the air stream and are thus retained in the container. Use of this technique alone does not address fine airborne dust.

Another solution to the problem of removing dust involves the use of water to suppress dust. While effective, using a water spray or mixing system necessarily requires the carrying of a sufficient amount of water onboard. Naturally, this increases the weight and complexity of the vehicle and may impose limits as to its operation.

For these and other reasons, there remains a need for improved and alternative devices and systems for handling airborne debris in debris collection and particulate acquisition systems. The invention satisfies the need by providing such devices and systems, debris collection vehicles that incorporate such devices and systems, and methods of using such devices, systems, and vehicles. These and other advantages of the invention, as well as additional inventive features, will be apparent from the description of the invention provided herein.

BRIEF SUMMARY OF THE INVENTION

The invention provides debris separation and removal systems; debris collection, separation, and removal systems incorporated into mobile cleaning, sweeping and/or collection vehicles and the like. The devices and systems according to embodiments of the invention are useful as (or as part of)

mobile particulate collection systems. For example, in a preferred aspect, the invention provides a self-propelled vehicle including at least one of the inventive debris separation-removal systems.

In a more general form, embodiments of the invention include a dust extraction system including an array of two or more axial cyclones. The array of axial cyclones is configured to operate in parallel. The array of axial cyclones includes one or more sensor and a controller in communication with the sensor and is adapted to receive air flow information from the one or more sensor. Inflow valves or gates are operatively connected to the controller such that air flow through the array of axial cyclones is monitored by collecting and analyzing data from the sensor and maintained at an optimum operating condition for each of the individual cyclones in the array by controlling the state of the valves. This is done, in general, by opening the inflow valves as the air flow increases to a predetermined value and shutting inflow valves as air flow decreases below a predetermined threshold.

In another exemplary aspect, the above-described array of axial cyclones is used in a mobile vacuum sweeper vehicle. The array can be used, for example, in place of conventional filter media, water spray systems, or tangential and other separator mechanisms. One example of vehicles to which the present dust extraction system can be applied is Elgin Sweeper® products, such as the GeoVac®.

Key operating parameters of an axial cyclone, including the collecting efficiency and the pressure drop, are governed at least in part by the dimensions, namely the cross sectional areas and lengths of the unit. The diameter of a cyclone strongly influences its collecting efficiency. Smaller diameters provide greater collecting efficiency. The dust discharge opening should be as small as possible, in order to maintain a high rate of flow therethrough to forestall clogging. Cyclone overall length affects not only flow resistance but also collecting efficiency. Increasing cyclone overall length will increase both its flow resistance and collecting efficiency. The cyclones used in the present invention preferably are operated at or above five (5) feet per second (FPS) of air flow. This operational threshold is dependent on the particular attributes of the axial cyclones used. It will be understood that the monitoring of air flow through the system of axial cyclones is used in controlling the system to maintain optimal air flow through each of the array of axial cyclones. In other words, when the amount of air flow through the particular axial cyclone is determined, this value may be used as a threshold or trigger in controlling the system. When the air flow drops below the threshold, one or more cyclone is shuttered by closing an appropriate valve and air flow should increase or be maintained in the remaining cyclone(s) at a predetermined level. When air flow through the system increases to a value above the threshold, the system may open one or more additional cyclone valve to permit an increase in the amount of air flow through the system.

The invention also provides methods of separating and filtering airborne debris particles. One exemplary method of the invention includes: (1) providing a debris collecting system comprising an air flow generator and a debris separation unit having an array or two or more axial cyclones, wherein each cyclone includes a housing, an inlet with a shutter and a turbine, and an exit end with a scavenging area; (2) generating an air flow with the air flow generator, which air flow delivers the debris laden air into the array thereby forming a centrifugal air flow in the housing, such that at least a portion of the debris is urged into the scavenging area in the exit end of the cyclone housing; (3) drawing a secondary negative pressure in the scavenging area, thereby removing the debris laden air; (4) monitoring air flow through the array; (5) controlling the shutters for each cyclone to maintain the array at an optimum air flow; and (6) permitting the debris-free air to exit from the system.

DETAILED DESCRIPTION OF EMBODIMENTS OF THE INVENTION

Embodiments of the invention described herein may be used with commercially available cleaning or sweeping vehicles, for example, wherein dust removal from an air flow is desired. It will be understood that any suitable vehicle, which performs cleaning, sweeping, vacuuming or acquisition of particulate matter, fluids and the like, will benefit from embodiments of the present invention. Different sized and shaped dust separation systems may be employed dependent upon the functional parameters of the device to which the system will be attached, as well as the provision of ductwork or passages to couple the dust removal system to the other structural and functional aspects of the vehicle. Furthermore, it will be understood that the operating parameters discussed herein are exemplary in nature and not to be construed as limiting. Air flow thresholds, in particular, will be dependent upon the size and shape and number of axial cyclones used in the array, the vacuum-generating device(s) used, the application of the system to a vehicle and the desired efficiency, for example.

Figure 1:
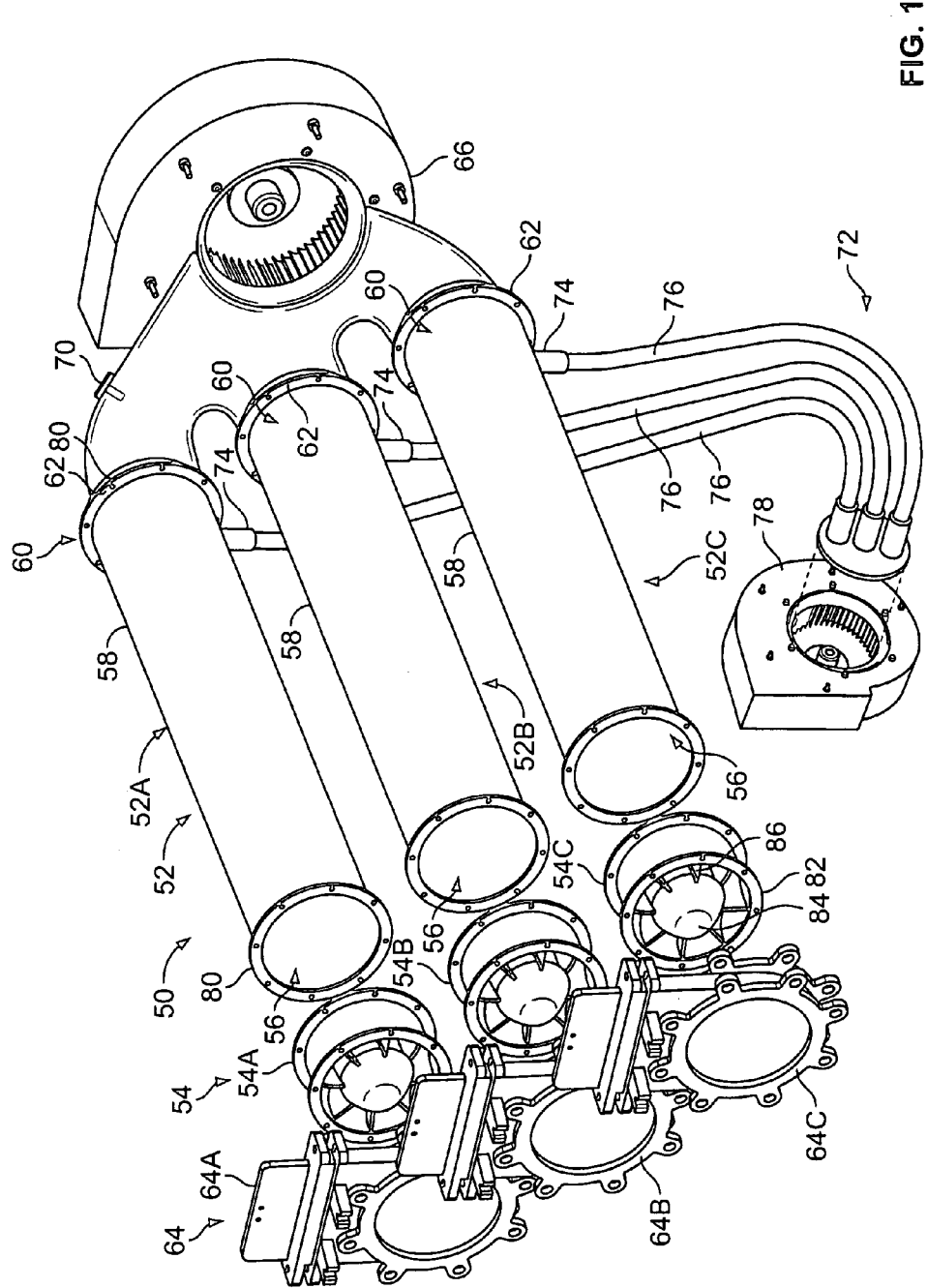
FIG. 1 shows a dust separation system according to one embodiment of the present invention.

The invention, turning to FIG. 1, and in its most general form includes a dust removal system 50 including a number of centrifugal dust removal devices, which in the present example is an array or gang of axial cyclones 52 (individually indicated at 52A, 52B, 52C) preferably arranged in a parallel operating configuration. Each of the axial cyclones 52 includes a turbine 54 (individually indicated at 54A, 54B, 54C) at an inlet end 56, an elongate cylindrical body 58 and a collection or separation section 60 at an exit end 62.

Supply of intake air to each turbine 54 is metered by a valve or shutter 64 (individually indicated at 64A, 64B, 64C). A vacuum generating device 66 preferably connects to the cyclones 52 by way of a manifold 68. The vacuum device 66 functions to generate a primary negative pressure in the manifold 68. Thereby, a negative pressure is conveyed to and air flow is generated in one or more of the axial cyclones 52 when a respective shutter 64 is in an open condition. In one preferred embodiment, a flow monitoring device 70, i.e., a device or sensor for sensing the amount of air flowing through the system 50 is positioned, in one embodiment, in the manifold 68. The flow monitoring device 70 should be positioned to accurately measure flow in the manifold 68 regardless of which of the cyclones 52 are in operation. Preferably, in FIG. 1 the sensor 70 should be positioned in the manifold 68 centered between the centrifugal dust removal devices 52A-C. It will be understood that the position of the sensor 70 is dependent upon how many devices 52 are present, the shape of the manifold 68 and other factors.

The flow monitoring device 70 and shutters 64 are connected to a controller (not shown), which monitors air flow or the like sensed by the flow monitoring device and controls the shutters 64 to maintain a predetermined optimal air flow through the system 50. The flow monitoring device 70, shutters 64 and controller can be collectively considered a flow metering system for operation of the dust removal system 50.

A scavenging system 72 is attached to the exit end 62 of the cyclones 52 in communication with the separation section 60. The scavenging system 72 may include a port 74 disposed on the exit end 62 and in communication with the separation section 62 of each of the cyclones 52. A duct 76, pipe, hose or the like is connected to each port 74. A scavenge system vacuum device 78 is connected to the ducts 76 to generate a secondary negative pressure in the scavenging system 72 to draw suspended dust and detritus from the separation section 60. Each of the components noted above will be discussed in further detail hereinbelow. In one embodiment, the vacuum device 78 can be replaced by a collection box, housing, bag or non-active collection zone where material from the port 74 comes to rest instead of being pumped or swept out by application of negative pressure in the separation section 60.

Each cyclone 52 of the system 50 has a form defined at least in part by body 58, which includes an elongate cylinder, wherein the cylinder preferably includes a respective flange 80 formed at each of the inlet end 56 and exit end 62 for attachment to adjacent portions of the system. Each body 58 may have a length from about 2 feet to about 8 feet.

A turbine 54 is fastened on or in the inlet end 56 of each of body 58. Each turbine 54 includes a turbine housing 82, which is about the same diameter as the body 58 and has a cylindrical shape. A hub 84 is positioned centrally within the turbine housing 82. Preferably, the hub 84 has a cone or rounded shape to promote efficient air flow through the turbine 54. A plurality of fixed blades 86 are positioned to span the distance between an interior surface of the turbine housing 82 and the hub 84. The blades or vanes 86 are angled with respect to the long axis of the body 58 to cause air passing through the turbine 54 to be urged into a curvilinear motion, e.g., a curved, cyclonic, spiral or helical pattern, which tends to cause heavier particles to be moved outwardly toward the interior periphery of the body during operation.

The interior structure and function of each cyclone 52 is conventional in that the dust collection or separation section 60 in the exit end 62 includes an internal coaxial tube 90 (see FIG. 2) creating an annular dust collection zone 92 (see FIG. 2) between the interior tube and outside of the body 58, as is well known in the art. Each exit end 62 may include a de-swirl device 94, which functions to convert the air flow inside the tube, which has a curved motion (C), to a non-curved motion (L) (see FIG. 2).

At the downstream, or exit end 62 of the body 58 is the separation section 60 of each of cyclones 52. The scavenging system may include a port 74 fitted to each separation section 60 for extraction of dust which is urged and drawn into the separation section during operation of the system 50. A duct, pipe 76 or the like, conveys air and dust from the port 74 in each separation section 60 as a result of the operation of the secondary vacuum device 78, which may be a fan, centrifugal fan, blower, pump (i.e., a positive displacement pump) and so on. In a preferred embodiment, the secondary vacuum device 78 is controlled to operate at and/or generate a condition of negative pressure about 10 percent of that of the primary vacuum device 66. Material extracted from separation section 60 is conveyed to a static chamber or the main collector/hopper of the vehicle (see FIG. 3).

The system 50 includes a primary vacuum device 66, which may be fan, a centrifugal fan, a blower, a pump (i.e., a positive displacement pump) and so on, capable of generating sufficient negative pressure to operate all of the cyclones 52A-52C together. The primary vacuum device 66 is provided in communication with each of the cyclones 52 through a manifold 68 fastened to each exit end 62 flange 80.

The system 50 depicted includes an array of three cyclones 52 arranged in a parallel configuration. It should be understood that alternate embodiments of the invention contemplate from two to three to more than three cyclones in parallel configuration with a suitable adaptation of the other elements of the system. For example, the vacuum devices 66 and 78 must have the ability to generate sufficient negative pressure to operate all of the cyclones 52 at their peak operating flow depending on the flow capacity of the cyclones. If each cyclone 52 requires about 2000 CFM of air flow to operate efficiently, then the primary vacuum device must be capable of generating about 6000 CFM of air flow through the system 50 or at least five (5) FPS of air flow, for example. Similarly, the secondary or scavenge vacuum device 78 must be capable of generating about 10% of the air flow or vacuum of the primary vacuum device 66 or about 600 CFM of air flow through the scavenging system 72.

The system includes a sensor 70, preferably positioned in the manifold 68, which may be a mass air flow sensor (MAF), vane air flow meter sensor, vortex air flow meter, hot wire air flow sensor, static head pressure sensor or any suitable sensor capable of generating a signal corresponding to the air flow through the manifold 68. In the alternate, the sensor may be a plurality of sensors, each positioned in a respective cyclone body 58 to monitor the air flow therethrough.

In operation, a controller (not shown) opens and closes shutters 64 in response to changes in sensed pressure by the sensor 70. The controller will include electric/electronic circuits and devices, known in the art, to sense changes in air flow through the system 50 and open and close the shutters 64 consecutively as needed to maintain and air flow of about five FPS through the system. Since the area of each body is known, the controller can calculate the CFM air flow through the system 50 and can make adjustments accordingly to maintain about five FPS or a predetermined air flow value, like CFM or a similar value, according to the system operating parameters.

There are a number of variables which may be encountered during operation of the vehicle which may require an adjustment by the controller to maintain optimum air flow through the system 50. For example, the controller may close shutters at startup to permit the system to build up vacuum and may close shutters at shutdown as the system loses flow (CFM). Increasing amounts of restriction in the system 50 will cause a flow loss therein. The flow loss can be caused by an increase in materials being taken in, an increase in the proximity of the vacuum head to a surface, for example. The operating speed of the system can cause variations in flow. The flow of the system may vary by about 50 percent and so the controller is important in maintaining proper air flow. It will be understood that the type of vacuum device may influence how the system varies. For example, a centrifugal fan behaves in a fashion unlike a positive displacement device in reacting to changes in operation.

Thus, the system 50 is controlled to operate at peak dust removing efficiency regardless of the state of other vehicle systems or other operating variables. For example, during start-up of the vehicle, the air flow through the system 50 will be relatively low and therefore the controller only permits one of the shutters, e.g., 64A to open. Air and dust then only enters axial cyclone 52A through turbine 54A. The air traveling through the turbine 54A is urged into a helical or curved direction within tube 52A and the dust is separated by the time the air reaches the exit end 62. Dust-free air enters the manifold 68 and the separated dust is drawn from the separation section 60 by functioning of the scavenging system 72. As the primary vacuum device 66 gradually increases the vacuum or conditions change so as to permit an increase in air flow through the system 50 the controller opens shutter 64B to permit operation of cyclone 52B and so on.

Figure 2:
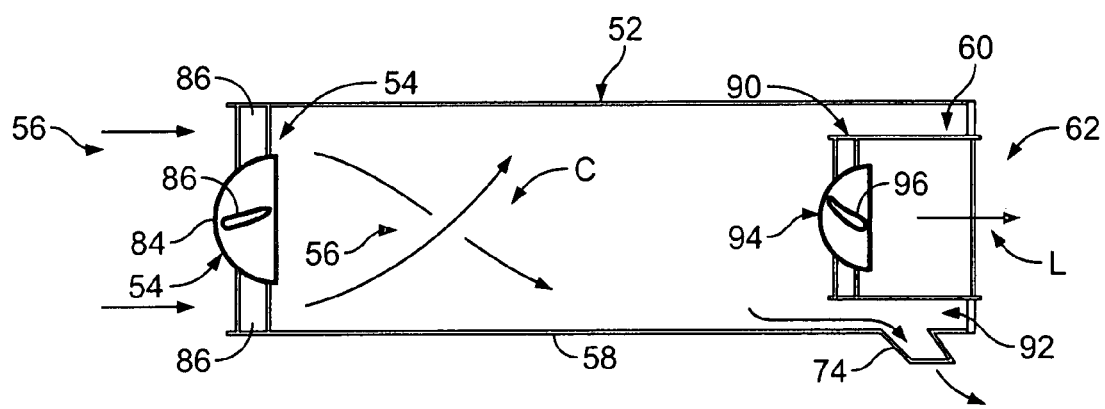
FIG. 2 shows one axial cyclone in a partial cross section view.

Turning to FIG. 2, a diagrammatic representation of one axial cyclone in side view is shown. The axial cyclone 52 includes a body 58, which has the form of an elongate cylinder. An inlet end 56 of the body 58 includes a turbine 54 with a central hub 84 with a plurality of angled vanes 86 extending from the block to the body 58. The vanes 86 impart a spin to incoming air to cause a cyclonic, swirling or angled motion (C) inside the axial cyclone 52 as is known in the art. The motion of the air inside the cyclone 52 causes particulate matter, dust and fluids to be urged toward the outer periphery of the body 58 and ultimately, the separation section 60 at the exit end 62 of the cyclone.

A collection zone 92 of the separation section 60 is defined between the body 58 and an internal concentric tube 90, which extends partway into the interior of the body from the exit end. Dust and other materials are extracted from the collection zone 92 via port 74. The interior of the internal tube 90 may include an optional de-swirl device 94 for urging the curvilinear air flow (C) into a more linear, laminar or straightened flow (L) at exit end 62. The de-swirl device 94 is similar to the turbine 54 except the vanes 96 are angled to negate the curvilinear air flow (C) from a curving path and establish a more linear air flow. It is believed that inclusion of the de-swirl device 94 increases the overall efficiency of the cyclone 52.

Figure 3:
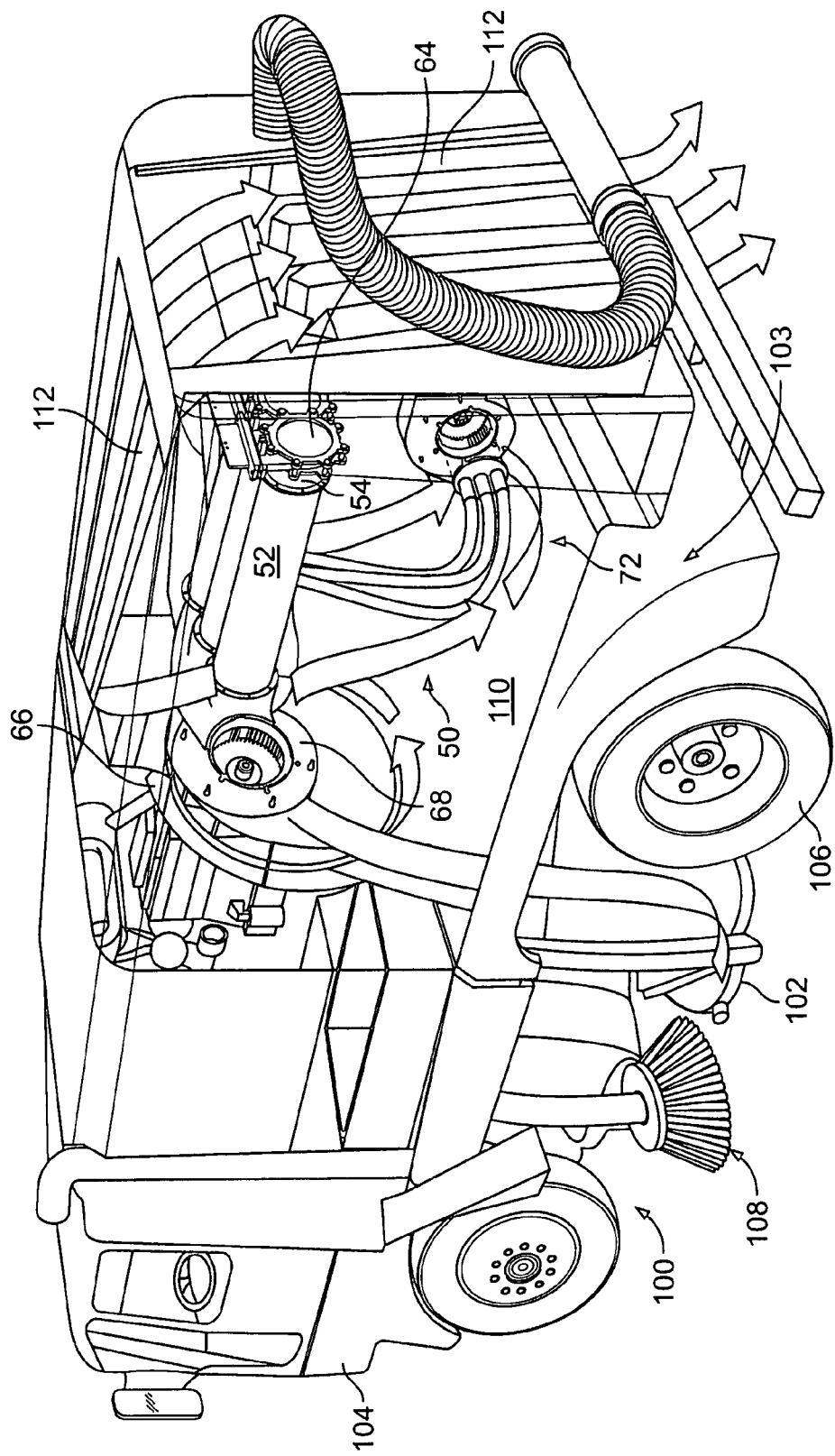
FIG. 3 shows a street sweeper and dust separation system according to one embodiment of the invention.

FIG. 3 shows the above described system 50 applied to dust removal in a street sweeper 100 having a pick up head 102 in accordance to one embodiment of the present invention. The sweeper 100 includes a conventional truck chassis 103 carrying a cab 104, conveyed by wheels 106. The chassis 103 includes one or more conventional rotary side brushes 108, and a vacuum pick-up head 102. The brushes 108 function to free debris from an adjacent surface and convey the debris into the vicinity of the vacuum head 102.

The large enclosure atop the chassis 103 is conventionally called the main hopper or the collection hopper or the static chamber 110. The collection hopper 110 is a large enclosure, which serves as a chamber, permitting heavier debris and/or fluids to settle out of the air flow and serves to retain the separated debris and/or fluids.

Air flow including debris is drawn through the vacuum head 102 into the collection hopper 110 by operation of the primary vacuum-generating device 66, in this example, a centrifugal fan. As detailed above, the device 66 may be any mechanism which is capable of generating sufficient negative pressure and air flow. Heavy debris is deposited and remains trapped in the collection hopper 110 by the force of gravity and a drop in air flow in the collection hopper, created at least in part, by a tortuous air path as is known in the art.

In this embodiment, a dust removal system 50 is disposed in the collection hopper 110 itself and draws air flow and suspended dust, and so on, from the air in the hopper. Dust and debris which remains suspended in the air of the collection hopper 110 enters the dust removal system 50 when gates 64 are open. Air flow through the dust removal system 50 is generated by the negative pressure being generated by the primary vacuum device 66 acting in communication and through the system via manifold 68. Dust is urged into a cyclonic or twisting motion through functioning of the cyclones 52 and is removed from the air flow through the dust removal system 50 by scavenging system 72, detailed in FIG. 2, acting in communication with the exit end 62 of the cyclones 52. Dust extracted by the scavenging system 72 may be deposited or permitted to remain trapped in the hopper 110. Treated air flow exiting the cyclones 52 is pulled through the manifold 68, the vacuum device 66 and exits the sweeper 100 via conventional ducts 112 formed in the sweeper chassis 103. In this manner, only treated air exits the sweeper 100, without the need for employing filters or filter bags, and without the requirement for providing space for tangential cyclones.

While the present invention has been described and illustrated with reference to specific embodiments, those skilled in the art will recognize that modifications and variations may be made without departing from the principles of the present invention as described hereinabove and set forth in the following claims. It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

What is claimed is:

1. A system for removing dust from an airflow, comprising:
    two or more centrifugal dust removal devices, each of said two or more centrifugal dust removal devices separately including an intake end and an exit end;
    a pressure generating device in operational communication with one of said intake end and said exit end of said two or more centrifugal dust removal devices to move airflow therethrough, and
    a flow metering system that meters incoming airflow of said two or more centrifugal dust removal devices, said flow metering system including a separate valve positioned at an end of each of said two or more centrifugal dust removal devices, said valves capable of operating independently of each other, an airflow sensing device detecting airflow in the system, and a controller operating said valves,
    wherein said pressure generating device is positioned downstream said two or more centrifugal dust removal devices.

* * * * *